US012099466B1

United States Patent
Nebeker (10) Patent No.: US 12,099,466 B1
(45) Date of Patent: Sep. 24, 2024

(54) EMBEDDED SYSTEMS ENVIRONMENT HAVING IMPROVED OVERLAY FILE SYSTEM STORAGE MANAGEMENT

(71) Applicant: Hewlett Packard Enterprise Development LP, Spring, TX (US)

(72) Inventor: Robert A. Nebeker, Lincoln, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/465,925

(22) Filed: Sep. 12, 2023

(51) Int. Cl.
*G06F 16/16* (2019.01)
*G06F 16/11* (2019.01)
*G06F 16/18* (2019.01)
*G06F 16/182* (2019.01)

(52) U.S. Cl.
CPC .......... *G06F 16/122* (2019.01); *G06F 16/162* (2019.01); *G06F 16/184* (2019.01)

(58) Field of Classification Search
None
See application file for complete search history.

(56) References Cited

U.S. PATENT DOCUMENTS

| | | | |
|---|---|---|---|
| 7,197,516 B1 * | 3/2007 | Hipp | G06F 16/10 |
| 2011/0231370 A1 * | 9/2011 | Aurora | G06F 16/188 |
| | | | 707/831 |
| 2012/0016847 A1 * | 1/2012 | Provencher | G06F 16/10 |
| | | | 707/693 |
| 2017/0083541 A1 * | 3/2017 | Mann | G06F 16/119 |
| 2019/0392050 A1 * | 12/2019 | Weil | G06F 16/176 |
| 2020/0183766 A1 * | 6/2020 | Kumar-Mayernik | |
| | | | G06F 16/1805 |

* cited by examiner

*Primary Examiner* — Son T Hoang
(74) *Attorney, Agent, or Firm* — Hewlett Packard Enterprise Patent Department (57) ABSTRACT

As a part of an embedded system environment, an overlay filesystem package manager obtains package files for a filesystem operation. the package files are stored in a temporary memory location. a composite layer presenting upper and lower filesystems of an overlay filesystem, is accessed to compare the package files with an associated files in the composite layer. When a difference is detected between a package file and an associated file, the package file is copied or moved to the upper filesystem. If the package file is not different from the associated file in the composite layer, it is not copied and deleted from the temporary memory location.

24 Claims, 5 Drawing Sheets

FIG. 4

EMBEDDED SYSTEMS ENVIRONMENT HAVING IMPROVED OVERLAY FILE SYSTEM STORAGE MANAGEMENT

BACKGROUND

When working in an embedded system environment with limited volatile and non-volatile memory, it is a common practice to couple a read-only underlay filesystem with a read/write overlay filesystem. Files in the overlay filesystem eclipse those in the underlay filesystem so the user is presented with a composite filesystem where unmodified files come from the underlay filesystem and modified files come from the overlay filesystem. This configuration allows the read-only underlay filesystem to reside in non-volatile (e.g., read-only) memory while the (typically small number of) changes to files on the filesystem made during a release cycle or run session are stored in the read/write overlay filesystem in volatile (e.g., random-access) memory.

BRIEF DESCRIPTION OF THE DRAWINGS

Various objects, features, aspects and advantages of the inventive subject matter will become more apparent from the following specification, along with the accompanying drawings in which like numerals represent like components.

While the examples are described with reference to the above drawings, the drawings are intended to be illustrative, and various other examples are consistent with the spirit, and within the scope, of this disclosure.

DETAILED DESCRIPTION

Package management systems are used to assemble various related software files into a specially formatted package file. For example, a package file can include one or more programs that may be related to each other for the purpose of performing a particular task, such as to execute an application or implement an aspect of an operating system. The one or more programs also may include system initialization scripts, a command shell, web server and/or data center support software, or the like. A package file also may include associated data, documentation, and/or configuration information for the program(s). The package file keeps the related software objects together until the file is opened and the contents are used to implement a software installation, e.g., a software patch update, a new version release, or the like.

An operating system package manager such as the Red Hat Package Manager (also referred to as "RPM Package Manager" or "RPM") is one example of a package management system. RPM is a LINUX™-based application used to install, upgrade, or de-install applications, e.g., within a cloud-based computer network. In RPM, a package file may be referred to as a "package" or an ".rpm file". The term "RPM" also may be used interchangeably to refer to either one of a package management system or a package file.

A filesystem is a hierarchy of directories for organizing files in an embedded system. File systems include a collection of files along with their management protocols. File system middleware and/or application software is mounted (attached or installed) at a mount point (directory location) in a currently accessible storage device, and a kernel typically provides file system management mechanisms, e.g., for file operations (create, delete, read, write, open, close, etc.) and directory access, creation, and deletion.

An overlay filesystem (sometimes referred to as a union filesystem or union-mount filesystem) combines multiple different underlying mount points into one or more composite lower directory structures that contain underlying files and sub-directories from one or more sources; and overlays upper directory filesystems on top of the lower directory, such that files in the upper directory supersede files in the composite lower directory. For example, the LINUX™ Overlay File System (OverlayFS) provides overlay-filesystem functionality in LINUX™. While the lower directory structure of an overlay filesystem is typical stored in read-only, non-volatile memory, the upper directory structure is typical stored read/write, volatile memory that can be modified. For example, the modified files in the overlay upper directory structure (e.g., a software patch update or a new version release delivered via a package file) supersede the original files in the underlay lower directory structure. Thus, when a particular file object exists in both filesystems, the object in the 'upper' filesystem is visible to a user and/or at least one processor coupled to the memory while the object in the 'lower' filesystem is either hidden or, in the case of directories, merged with the 'upper' object.

Data storage resources are often scarce within an embedded system environment. Embedded systems can include, for example, real-time embedded systems; stand-alone embedded systems; networked information appliances; or mobile devices. Storage can be either volatile memory that requires power to maintain stored information, or non-volatile memory that can retain stored information even after power is removed. In general, volatile memory can be more expensive than non-volatile memory and oftentimes has less memory capacity. Therefore, resource management should preserve volatile memory. Whether the memory-type is volatile or non-volatile, space within either of these memory types should only be used when expedient or beneficial. For an overlay filesystem within the embedded system environment, the read-only underlay resides in non-volatile memory, while modified files of the read/write overlay reside in volatile memory. As such, changes to files within the filesystem during a run session are stored in the read/write overlay in volatile memory.

Overlay filesystems, such as OverlayFS, do not efficiently manage storage resources in many typical software upgrade scenarios. Current overlay technology will store in the overlay a copy of each file that is copied to the filesystem even if the file is identical to the copy of the file found in the underlay. In such an environment, making changes to many files or to very large files can quickly use up the limited amount volatile storage. This problem is further aggravated by systems that support live software updates or "hot-patching" because new binaries are deployed. Typically, the packages used to deploy these software updates contain a mix of files and binaries that have changed and those that have not, but all files that are contained in the update are copied to the filesystem, and therefore, to the overlay, so they use up storage in the volatile memory overlay whether or not they are actually different from the version already in the underlay. That is, even if the file copy on the lower directory is the same as the file copy on the upper directory, current overlay technology will store the file in the read/write overlay in volatile memory. This redundancy is not beneficial in that it detracts from the system's optimum performance, since space in volatile memory should be preserved for expedient tasks without redundancy.

There are further storage inefficiencies for updates to a large number of files, since these files are stored in the read/write overlay in volatile memory. Accordingly, the limited memory capacity of volatile storage is quickly filled. The same occurs for large-size files.

As a further disadvantage, when live (real-time) software updating or "hot patching" is performed, numerous files and new binaries are also stored in the read/write overlay in volatile memory. Regardless of whether the files of a latest version differ from the files of a previous version stored in the read-only underlay, current overlay file systems copy all files in a package onto the read/write overlay in volatile memory. This condition limits the size and number of changes that can be made to the OverlayFS, effectively limiting how many files can be efficiently updated during a particular hot patch.

The following examples describe a system, method, and article of manufacture for implementing improved overlay filesystem storage management. The system and method of storage management includes a storage management controller or overlay filesystem manager operative to bypass a package management system's file copy mechanism. This "bypass" method may be implemented within a kernel file system management mechanism. For example, a package file for an application upgrade or new release may be stored in, and retrieved from, a temporary memory. Each new file of a package file may then be compared with an associated previous-version file stored in an underlay or overlay filesystem. If a match is found, the new file is not stored in the overlay filesystem. If a match is not found (i.e., there is a difference between the new file and the associated previous file), the new file is copied or moved from the temporary memory to the overlay filesystem. This solution saves volatile memory by ensuring that only modified files are copied to the overlay filesystem.

In one example, at least one memory is configured to store an overlay filesystem comprising a lower filesystem containing one or more read-only underlay files or sub-directories, and an upper filesystem mounted above the lower filesystem and containing writable overlay files or sub-directories. A "composite" layer is configured to present a union of the upper and lower filesystems, the union comprising overlay files or sub-directories and underlay files or sub-directories that are not superseded by an overlay file or subdirectory.

When executing one or more file management software instructions in, e.g., an embedded system environment, an overlay filesystem package manager or storage management controller is operative to obtain one or more package files based on a request for a filesystem operation. The request for the filesystem operation may specify the one or more package files. The overlay filesystem package manager is further operative to store the one or more package files in a temporary memory location. The overlay filesystem package manager is further operative to access a composite layer stored in memory and configured to present a union of upper and lower filesystems of an overlay filesystem, the union comprising read-only underlay files or sub-directories and writable underlay files or sub-directories that are not super- seded by an overlay file or subdirectory within the overlay file system. The overlay filesystem package manager is further operative to compare each package file of the one or more package files stored in the temporary memory location with an associated file or sub-directory in the composite layer. The overlay filesystem package manager is further operative to detect whether a difference exists between the package file and the associated file or sub-directory in the composite layer, and copy or move/write the package file of the one or more package files to the upper filesystem if a difference exists between the package file and the associated file or sub-directory in the composite layer. In some examples, overlay filesystem package manager is further operative to not copy the package file of the one or more package files to the upper filesystem if the package file is not different from the associated file or sub-directory in the composite layer, and delete the package file of the one or more package files from the temporary memory location.

In some examples, the lower filesystem may comprise a non-volatile memory, and may combine different underlying mount points into one or more composite lower directory structures.

In some examples, the upper filesystem comprises a volatile memory.

In some examples, the request for the filesystem operation may comprise at least one of the following: a pre-installation script, a file update script, a new application release or version script, a file patch script, or a file replacement script.

In some examples, the one or more package files may comprise at least one of the following: an application, an update file comprising a new application release or version, a patch file, or a replacement file.

In some examples, the writable overlay files or sub-directories may comprise at least one of the following: an update file comprising a new software release or version, a patch file, or a replacement file.

In some examples, the instructions to obtain the one or more package files may further comprise instructions to halt a direct file copy of the one or more package files into the overlay filesystem.

In some examples, comparing the package file of the one or more package files may further comprise instructions to detect whether an earlier version of the package file is stored in the composite layer, and determine whether the package file differs from the earlier version of the retrieved file.

In some examples, the comparison of each package file of the one or more package files stored in the temporary memory location with an associated file or sub-directory in the composite layer may be performed without unmounting the overlay file system.

In some examples, the overlay file manager may comprise an overlay filesystem kernel. The overlay filesystem kernel may comprise an operating system kernel (e.g., LINUX™ kernel), the overlay filesystem may be an operating system overlay filesystem (e.g., LINUX™ Red Hat OverlayFS), and the overlay filesystem package manager may be an operating system overlay filesystem package manager (e.g., LINUX™ Red Hat Package Manager (RPM)).

Thus, advantageously, the improved storage management solution described herein saves volatile memory by ensuring that only files that have changed are copied to the overlay and consume volatile memory. The method is accomplished by bypassing a package management system's file copy mechanism and instead writing each new file from the package file to a temporary memory location, performing a comparison of the new file with an associated file (e.g., a previous version of the file) stored in the underlay or overlay filesystem, and copying or moving/writing the file from the temporary memory location to the overlay filesystem if it differs from the associated file.

Figure 1:
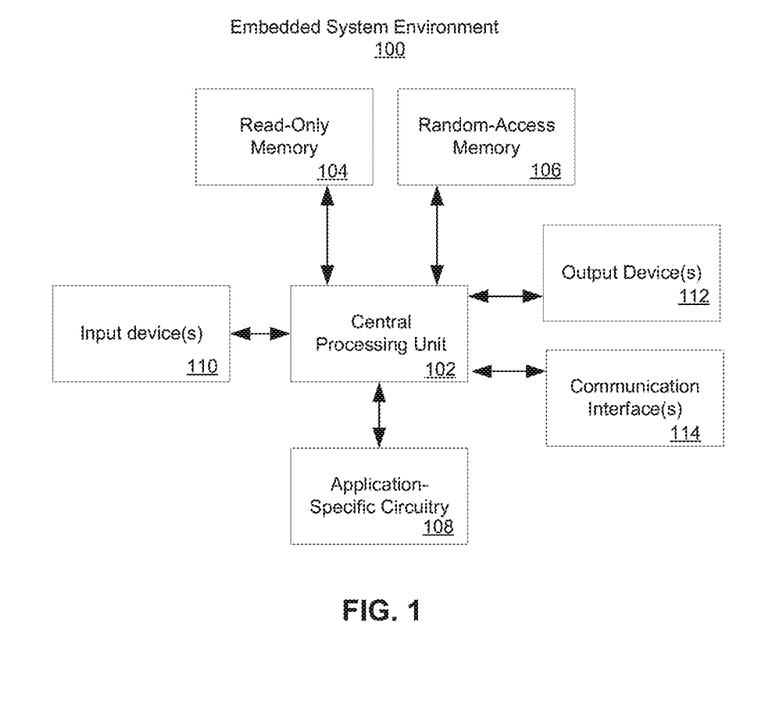
FIG. 1 illustrates an embedded system environment in accordance with some examples.

FIG. 1 illustrates an embedded system environment suitable for implementing an overlay file bypass system or overlay filesystem management system in accordance with some examples. As shown in FIG. 1, system 100 includes a central processing unit/at least one processor 102 coupled to and operative to run software stored in read-only memory 104 or random access memory 106 to control the actions of the various other circuits, such as application-specific circuitry (ASIC) 108, input device(s) 110, output device(s) 112, and communication interfaces 114.

Embedded systems, such as system 100, typical have limited processing, memory, and other resources. They typically do not have secondary storage devices. In many applications, embedded systems must be highly reliable and cannot be offline or reset. They may have to perform functions against specific deadlines or do work within a specific time. Further, some embedded systems may have to work in extreme environmental conditions, such as in very high temperature and humidity conditions.

Various types of embedded systems employ multiple different types of processors and/or operating systems 102 based on the tasks they are designed to perform.

Embedded systems can include, for example, real-time embedded systems; stand-alone embedded systems; networked information appliances; or mobile devices. A real-time embedded system is opertive to complete a specific task within a specific time period. A stand-alone embedded system works in stand-alone mode. This system lakes inputs from input devices 110, processes them and generates a required output, e.g., to an output device 112. The input can be from a human being, e.g., a human pressing a button, or in the form of electrical signals from transducers. The output can be in the form of electrical signals to drive another system or output device 112, e.g., an LCD or LED display is used for displaying information to the user.

A Network Information Appliance is an embedded system which is connected to a network via a communication interface 114 and may be accessed via one or more networks, e.g., a Local Area Network (LAN) or the Internet (not shown). For example, Network Information Appliance embedded systems typical run a protocol TCP/IP stack and then get connected via Point-to-Point Protocol (PPP) or Ethernet to a network and communicate with other nodes in the network. For example, network nodes may be notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), set-top boxes, cameras, integrated devices combining at least two of the preceding devices, and the like. In some examples, embedded system environment 100 may be coupled to a data center (not shown) and be a subscriber to cloud computing resources. In one example, an overlay filesystem management system as described below may be available to embedded system environment 100 via a subscription to cloud computing resources, e.g., to install, upgrade, or de-install applications, available within a cloud-based system. In one example, an external entity, such as web service, that needs to perform filesystem operations can communicate a request to embedded system environment 100, where the request for the filesystem operation may comprise, e.g., a pre-installation script, a file update script, a new application release or version script, a file patch script, or a file replacement script.

It is appreciated that the components of operating environment of system 100 are examples; wherein more or fewer components may be present in various configurations. It is appreciated that operating environment may be part of a distributed computing environment, a cloud computing environment, a client server environment, and the like.

As would be apparent to one of ordinary skill in the art after reading this description, the various features and functionality described herein as an embedded system environment may be implemented using any arrangement components necessary to perform the overlay filesystem manager features and functionality (described below); and can be implemented in one or more separate or shared units in various combinations and permutations.

Figure 2A:
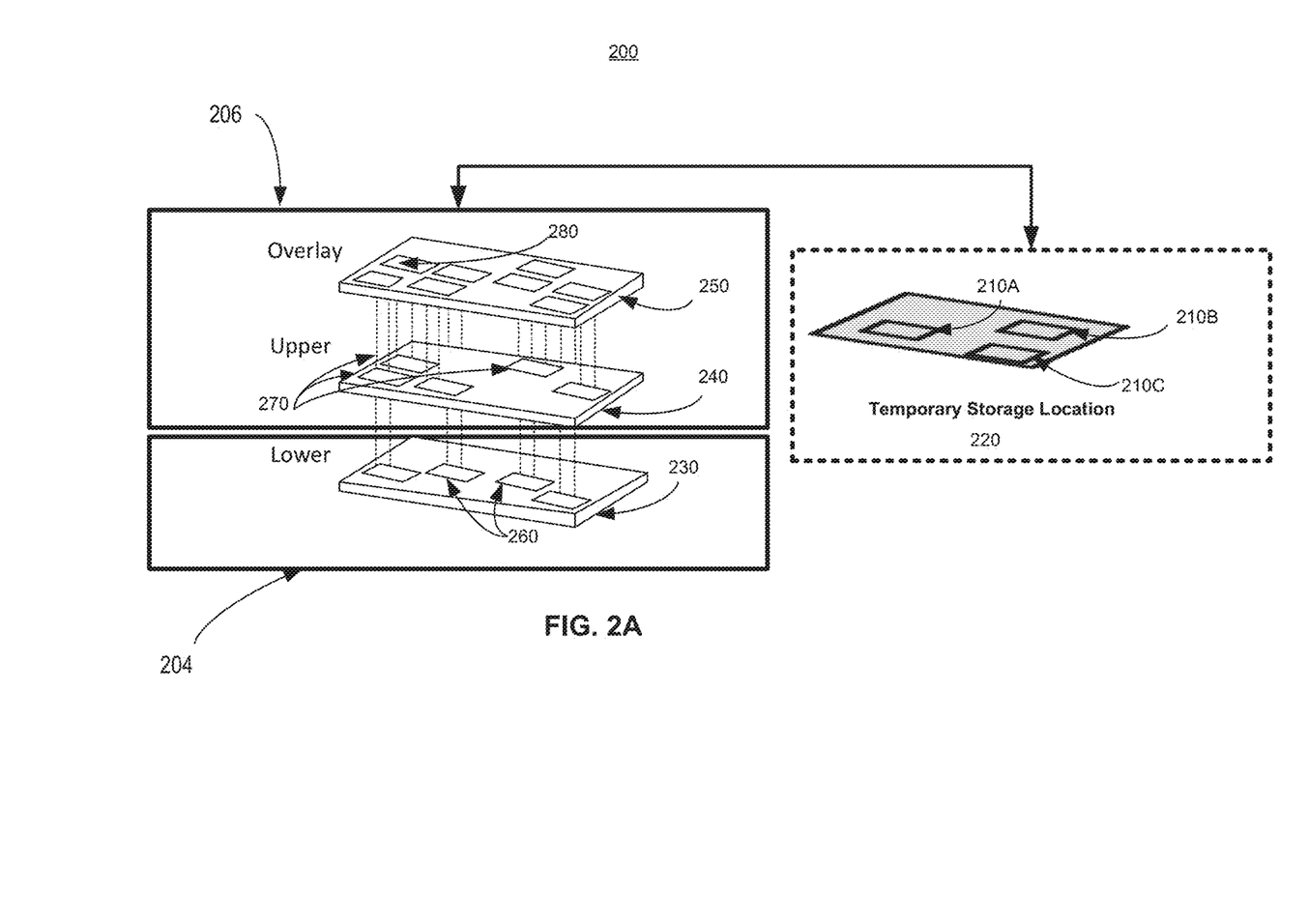
FIG. 2A illustrates an overlay filesystem environment block diagram in accordance with some examples.

FIG. 2A illustrates an overlay filesystem environment block diagram in accordance with some examples. In FIG. 2A, overlay filesystem environment 200 includes at least one memory, e.g., non-volatile/read-only memory 204 and volatile/random-access memory 206, configured to store an overlay filesystem comprising a lower filesystem 230 containing one or more read-only underlay files or sub-directories, and an upper filesystem 240 mounted above the lower filesystem and containing writable overlay files or sub-directories. A composite layer 250 is configured to present a union of the upper and lower filesystems, 240 and 230, the union comprising overlay files or sub-directories 270 and underlay files or sub-directories 260 that are not superseded by an overlay file or subdirectory. As a feature of the various examples herein, overlay filesystem environment 200 further comprises temporary memory location 220, which may be a location within random-access memory 206, or a remote storage at another location (as shown). The improved storage management solution described herein saves volatile memory 206 by ensuring that only files that have changed are copied to the overlay filesystem to consume volatile memory. In some examples, the method is accomplished by bypassing a package management system's file copy mechanism and instead writing each new file from the package file to temporary memory location 220, performing a comparison of the new file, e.g., new files 210A-C, with an associated file (e.g., a previous version of the file) stored in the underlay or overlay filesystem, e.g., associated file 280, and copying or moving/writing the new file from temporary memory location 220 to the overlay filesystem if it differs from the associated file.

Figure 2B:
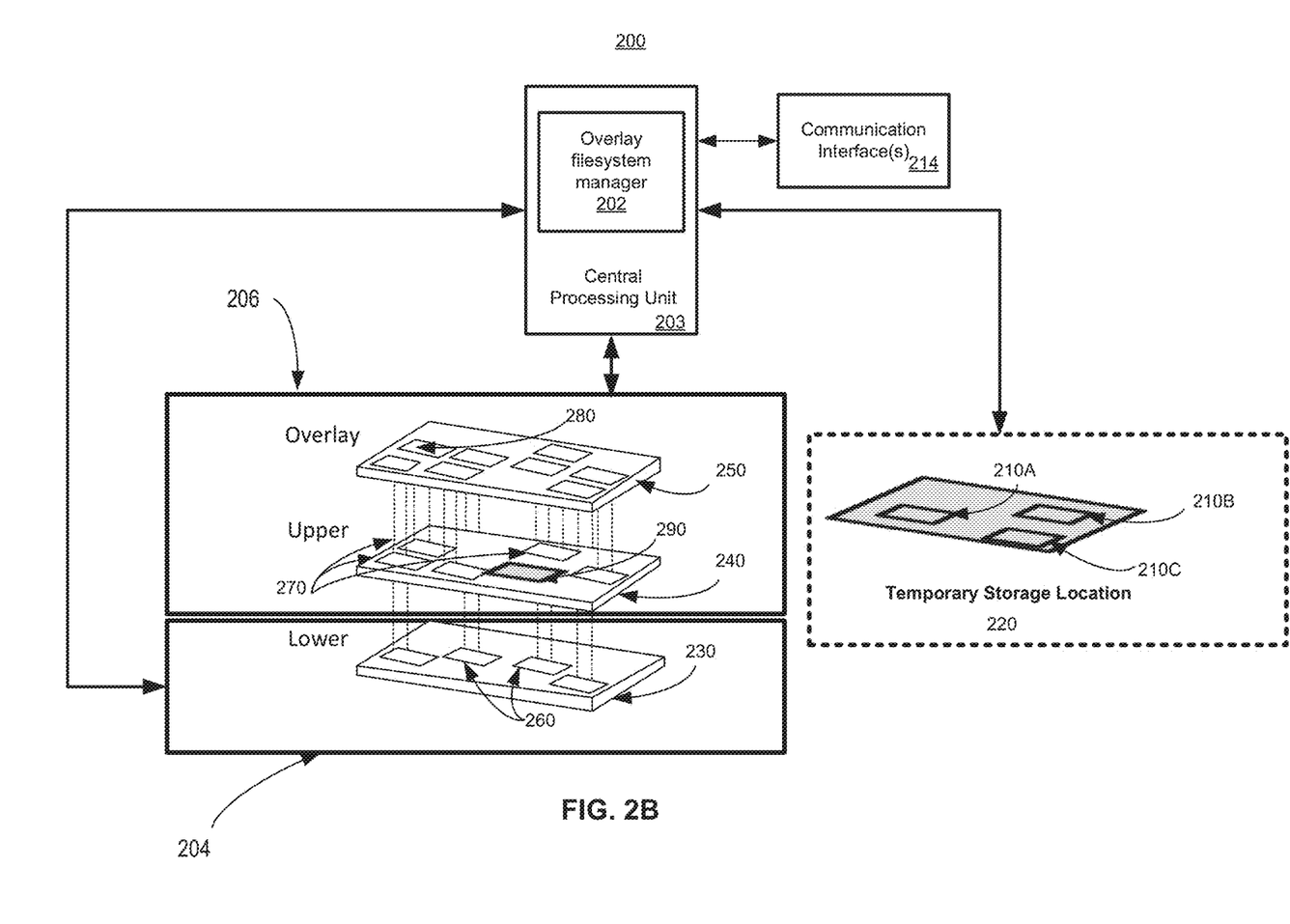
FIG. 2B illustrates an overlay filesystem package management operations block diagram in accordance with some examples.

FIG. 2B illustrates an overlay filesystem package management operations block diagram in accordance with some examples. In some examples, overlay filesystem manager 202 may be implemented within a central processing unit 203 and/or application-specific circuitry (not shown) of an embedded system, e.g., embedded system 100. In some examples, overlay filesystem manager 202 may reside on a client node of a network and perform one or more of the methods described herein. For example, a client node comprising overlay filesystem manager 202 may be one of a plurality of client nodes and server nodes that reside on a same LAN, or on different LANs that may be coupled together through the Internet, but separated by firewalls, routers, and/or other network devices. In some examples, the client node comprising overlay filesystem manager 202 may reside in a cloud network. In various examples, the client node comprising overlay filesystem manager 202 may be a network information appliance incorporated and/or in communication with one or more of a notebook computer, desktop computer, microprocessor-based or programmable consumer electronics device, network appliance, mobile telephone, smart telephone, pager, radio frequency (RF)

device, infrared (IR) device, Personal Digital Assistant (PDA), set-top box, camera, or an integrated device combining at least two of the preceding devices, and the like.

In operation, when executing one or more file management software instructions, an overlay filesystem package manager or storage management controller 202, e.g., implemented within a central processing unit 203 and/or application-specific circuitry (not shown) of an embedded system, is operative to obtain one or more package files, e.g., package files 210A-C, based on a received filesystem operations request, e.g., via communication interface 214. For example, the request for the filesystem operation may specify the one or more package files, e.g., package files 210A-C, which may include hundreds or even thousands of package files that may be relatively large (e.g., >1 MB), or relatively small (e.g., up to 1 MB).

The overlay filesystem package manager 202 is further operative to store the one or more package files 210A-C in a temporary storage or memory location 220. For example, the temporary memory location 220 may be a location within random-access memory 206, or it may be a remote storage at another location. In some examples, overlay filesystem package manager 202 is further operative to halt a direct file copy of the one or more package files into the overlay filesystem, and divert the package files to temporary storage or memory location 220.

The overlay filesystem package manager 202 is further operative to access composite layer 250 stored in memory (e.g., within random-access memory 206) and configured to present a union of upper filesystem 240 and lower filesystem 230 of an overlay filesystem, the union comprising read-only underlay files or sub-directories 260 that are not superseded by an overlay file or subdirectory within the overlay file system, and writable overlay files or sub-directories 270 (e.g., the latest updates to previous underlay or overlay files).

The overlay filesystem package manager 202 is further operative to compare each package file of the one or more package files 210A-C stored in the temporary memory location 220 with an associated file or sub-directory 280 represented in composite layer 230. For example, overlay filesystem package manager 202 is further operative to detect whether a difference exists between a package file, e.g., package file 210A, and an associated file or sub-directory 280 represented in the composite layer 230, and copy or move/write the package file of the one or more package files 210A-C to the upper filesystem 240 if a difference exists between the package file and the associated file or sub-directory in the composite layer. For example, package file 210A may be copied or moved to the upper filesystem 240, as represented by new package file 290. In some examples, overlay filesystem package manager 202 is further operative to not copy a package file of the one or more package files 210A-C to the upper filesystem 240 if the package file is not different from an associated file or sub-directory in the composite layer (e.g., when there are no changes to a previous version of the package file), and delete the package file of the one or more package files 210A-C from temporary memory location 220. Therefore, only the new package files remain in memory as part of the overlay filesystem by the end of the filesystem operation, and the temporary memory location 220 is purged for a next filesystem operation.

It is appreciated that the components of overlay filesystem manager 202 are examples; wherein more or fewer components may be present in various configurations. It is appreciated that operating environment may be part of a distributed computing environment, a cloud computing environment, a client server environment, and the like.

As would be apparent to one of ordinary skill in the art after reading this description, the various features and functionality described herein may be implemented using any arrangement components necessary to perform the overlay filesystem manager 202 features (and functionality); and can be implemented in one or more separate or shared units in various combinations and permutations.

Figure 3:
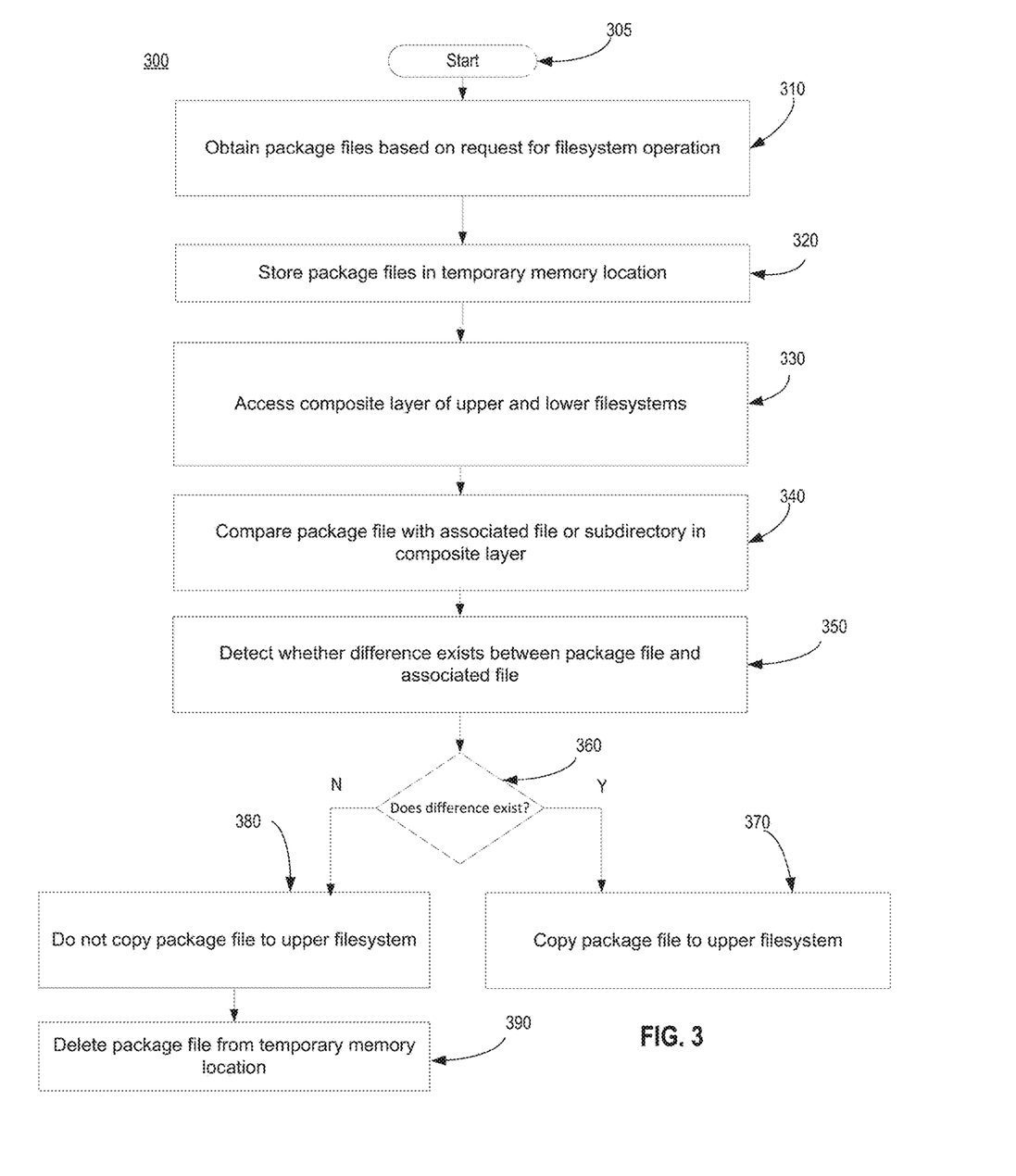
FIG. 3 illustrates an overlay filesystem package management flow diagram in accordance with some examples.

FIG. 3 illustrates an overlay filesystem package management flow diagram in accordance with some examples. Referring now to FIG. 3, an example of a flow diagram for the method of implementing overlay filesystem package management in accordance with some examples is shown. In action 310, when executing one or more file management software instructions, overlay filesystem package manager 202 is operative to obtain one or more package files based on a request for a filesystem operation. The request for the filesystem operation may specify the one or more package files. In action 320, overlay filesystem package manager 202 is further operative to store the one or more package files in a temporary memory location, e.g., temporary memory location 220. In action 330, overlay filesystem package manager 202 is further operative to access a composite layer stored in memory and configured to present a union of upper and lower filesystems of an overlay filesystem, e.g., overlay file system environment 200, where the union 250 comprises read-only underlay files or sub-directories (e.g., read-only underlay files or sub-directories 260, that are not superseded by an overlay file or subdirectory within the overlay file system), and writable overlay files or sub-directories 270. In action 340, overlay filesystem package manager 202 is further operative to compare each package file of the one or more package files stored in the temporary memory location with an associated file or sub-directory in the composite layer. In action 350, overlay filesystem package manager 202 is further operative to detect whether a difference exists between the package file and the associated file or sub-directory in the composite layer. For example, overlay filesystem package manager 202 may be further operative to perform a comparison of the new file with a previous version of the file stored in the underlay or overlay filesystem, and determine whether the package file differs from the earlier version of the retrieved file. If a difference exists between the package file and the associated file or sub-directory in the composite layer at decision block 360, overlay filesystem package manager 202 is operative to transfer, write, and/or copy the package file of the one or more package files to the upper filesystem in action 370. However, if the package file is not different from the associated file or sub-directory in the composite layer at decision block 360, overlay filesystem package manager 202 is further operative not to copy the package file of the one or more package files to the upper filesystem in action 380, and delete the package file of the one or more package files from the temporary memory location in action 390. In various examples, filesystem package manager 202 is operative to perform the comparison of each package file of the one or more package files stored in the temporary memory location with an associated file or sub-directory in the composite layer without unmounting the overlay file system.

Figure 4:
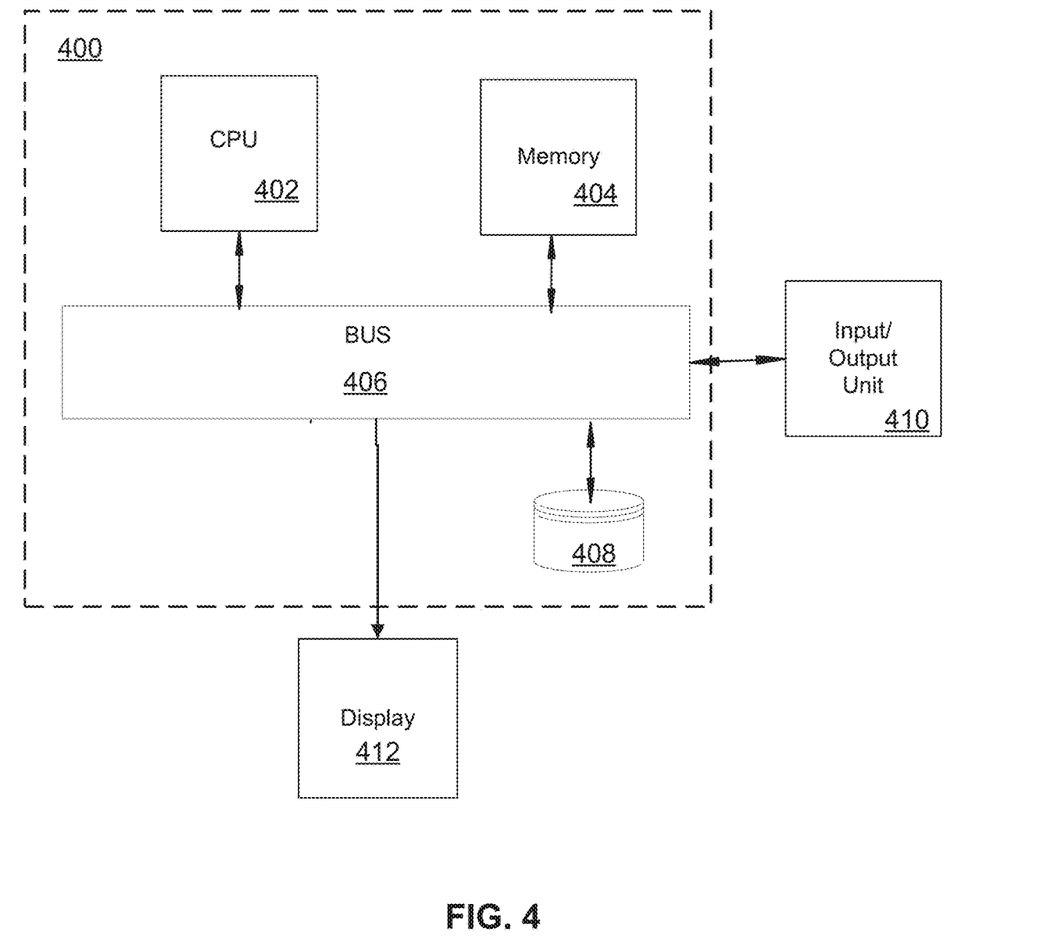
FIG. 4 is an illustration showing an example of a computing device which may implement the examples described herein.

It should be appreciated that the methods described herein may be performed with a digital processing system, such as a conventional, general-purpose computer system. Special purpose computers, which are designed or programmed to perform only one function may be used in the alternative. FIG. 4 is an illustration showing an example of the computing device which may implement the examples described herein. The computing device of FIG. 4 may be used to perform examples of the functionality for implementing overlay filesystem package management in accordance with some examples, including the operations of overlay filesystem package manager 202. The computing device includes a central processing unit (CPU) 402, which is coupled through a bus 406 to a memory 404, and mass storage device 408. Mass storage device 408 represents a persistent data storage device such as a floppy disc drive or a fixed disc drive, which may be local or remote in some examples. The mass storage device 408 could be a backup storage, in some examples. Memory 404 may include read only memory, random access memory, etc. Applications resident on the computing device may be stored on or accessed through a computer readable medium such as memory 404 or mass storage device 408 in some examples. Applications may also be in the form of modulated electronic signals modulated accessed through a network modem or other network interface of the computing device. It should be appreciated that CPU 402 may be embodied in a general-purpose processor, a special purpose processor, or a specially programmed logic device in some examples.

Display 412 is in communication with CPU 402, memory 404, and mass storage device 408, through bus 406. Display 412 is configured to display any visualization tools or reports associated with the system described herein. Input/output device 410 is coupled to bus 406 in order to communicate information in command selections to CPU 402. It should be appreciated that data to and from external devices may be communicated through the input/output device 410. CPU 402 can be defined to execute the functionality described herein to enable the functionality described with reference to FIGS. 1-3. The code embodying this functionality may be stored within memory 404 or mass storage device 408 for execution by at least one processor such as CPU 402 in some examples. The operating system on the computing device may be IOS™, MS-WINDOWS™, OS/2™, UNIX™, LINUX™, or other known operating systems. It should be appreciated that the examples described herein also may be integrated with a virtualized computing system.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "decomposing," "implementing," "monitoring," "identifying," "modifying," "generating," "translating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The various examples also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Reference in the description to "one example" or "an example" means that a particular feature, structure, or characteristic described in connection with the example is included in at least one example of the invention. The phrase "in one example" located in various places in this description does not necessarily refer to the same example. Like reference numbers signify like elements throughout the description of the figures.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present examples. It is to be understood that the above description is intended to be illustrative, and not restrictive. Many other examples will be apparent to those of skill in the art upon reading and understanding the above description. Although the present invention has been described with reference to specific examples, it will be recognized that the invention is not limited to the examples described but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items. As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular examples only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. With the above examples in mind, it should be understood that the examples might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the examples are useful machine operations. The examples also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A unit, an application, a layer, an agent or other method-operable entity could be implemented as hardware, firmware, or a processor executing software, or combinations thereof. It should be appreciated that, where a software-based example is disclosed herein, the software can be embodied in a physical machine such as a controller. For example, a controller could include a first unit and a second unit. A controller could be configured to perform various actions, e.g., of a method, an application, a layer or an agent.

The examples can also be embodied as computer readable code on a non-transitory computer readable medium. The computer readable medium is any data storage device that can store data, which can be read thereafter by a computer system. Examples of the computer readable medium include hard drives, network attached storage (NAS), read-only memory, random-access memory, CD-ROMs, CD-Rs, CD-RWs, magnetic tapes, flash memory devices, and other optical and non-optical data storage devices. The computer readable medium can also be distributed over a network coupled computer system so that the computer readable code is stored and executed in a distributed fashion. Examples described herein may be practiced with various computer system configurations including hand-held devices, tablets, microprocessor systems, microprocessor-based or programmable consumer electronics, minicomputers, mainframe computers and the like. The examples can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various examples, one or more portions of the methods and mechanisms described herein may form part of a cloud-computing environment. In such examples, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware; for example, circuits, memory storing program instructions executable to implement the operation, etc. Reciting that a unit/circuit/component is "configured to" or "operative to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the examples and its practical applications, to thereby enable others skilled in the art to best utilize the examples and various modifications as may be suited to the particular use contemplated. Accordingly, the present examples are to be considered illustrative and not restrictive, and the invention is not to be limited to the details given herein; but may be modified within the scope and equivalents of the appended claims.

What is claimed is:

1. A system comprising:
   at least one memory configured to store:
      an overlay filesystem comprising:

a lower filesystem containing one or more read-only underlay files or sub-directories; and
an upper filesystem mounted above the lower filesystem and containing writable overlay files or sub-directories; and
a composite layer configured to present a union of the upper and lower filesystems, the union comprising overlay files or sub-directories and underlay files or sub-directories that are not superseded by an overlay file or subdirectory; and
at least one processor coupled to the at least one memory, the at least one processor, when executing one or more file management software instructions, being operative to perform as an overlay filesystem package manager to:
obtain one or more package files based on a request for a filesystem operation;
store the one or more package files in a temporary memory location of the at least one memory;
compare, for each package file of the one or more package files stored in the temporary memory location, the package file with an associated file or sub-directory in the composite layer;
detect whether a difference exists between the package file and the associated file or sub-directory in the composite layer; and
copy the package file of the one or more package files to the upper filesystem if a difference is detected between the package file and the associated file or sub-directory in the composite layer.

2. The system of claim 1, further comprising instructions to not copy the package file of the one or more package files to the upper filesystem if the package file is not different from the associated file or sub-directory in the composite layer.

3. The system of claim 2, further comprising instructions to delete the package file of the one or more package files from the temporary memory location.

4. The system of claim 1, wherein the lower filesystem comprises a non-volatile memory.

5. The system of claim 1, wherein the lower filesystem combines different underlying mount points into one or more composite lower directory structures.

6. The system of claim 1, wherein the upper filesystem comprises a volatile memory.

7. The system of claim 1, wherein the request for the filesystem operation specifies the one or more package files.

8. The system of claim 7, wherein the request for the filesystem operation comprises at least one of the following: a pre-installation script, a file update script, a new application release or version script, a file patch script, or a file replacement script.

9. The system of claim 1, wherein the one or more package files comprise at least one of the following: an application, an update file comprising a new application release or version, a patch file, or a replacement file.

10. The system of claim 1, wherein the writable overlay files or sub-directories comprise at least one of the following: an update file comprising a new software release or version, a patch file, or a replacement file.

11. The system of claim 1, wherein the instructions to obtain the one or more package files further comprise instructions to halt a direct file copy of the one or more package files into the overlay filesystem.

12. The system of claim 1, wherein comparing the package file of the one or more package files further comprising instructions to:

detect whether an earlier version of the package file is stored in the composite layer; and
determine whether the package file differs from the earlier version of the retrieved file.

13. The system of claim 1, wherein the comparison of each package file of the one or more package files stored in the temporary memory location with an associated file or sub-directory in the composite layer is performed without unmounting the overlay file system.

14. The system of claim 1, wherein the overlay file manager comprises an overlay filesystem kernel.

15. The system of claim 1, wherein the overlay filesystem kernel comprises an operating system kernel.

16. The system of claim 15, wherein the overlay filesystem is an operating system overlay filesystem.

17. The system of claim 15, wherein the overlay filesystem package manager is an operating system package manager.

18. The system of claim 1, wherein the overlay filesystem comprises an embedded system environment.

19. A method comprising:
obtaining, by a storage management controller, one or more package files based on a request for a filesystem operation;
storing, by the storage management controller, the one or more package files in a temporary memory location;
accessing, by the storage management controller, a composite layer stored in memory and configured to present a union of upper and lower filesystems of an overlay filesystem, the union comprising read-only underlay files or sub-directories and writable underlay files or sub-directories that are not superseded by an overlay file or subdirectory within the overlay file system;
comparing, by the storage management controller, each package file of the one or more package files stored in the temporary memory location with an associated file or sub-directory in the composite layer;
detecting, by the storage management controller, whether a difference exists between the package file and the associated file or sub-directory in the composite layer; and
copying the package file of the one or more package files to the upper filesystem if a difference exists between the package file and the associated file or sub-directory in the composite layer.

20. The method of claim 19, further comprising not copying the package file of the one or more package files to the upper filesystem if the package file is not different from the associated file or sub-directory in the composite layer.

21. The method of claim 20, further comprising deleting the package file of the one or more package files from the temporary memory location.

22. A non-transitory computer-readable medium having software instructions stored thereon, which, when executed by one or more processors, cause the one or more processors to:
obtain, by a storage management controller, one or more package files based on a request for a filesystem operation;
store, by the storage management controller, the one or more package files in a temporary memory location;
access, by the storage management controller, a composite layer stored in memory and configured to present a union of upper and lower filesystems of an overlay filesystem, the union comprising read-only underlay files or sub-directories and writable underlay files or sub-directories that are not superseded by an overlay file or subdirectory within the overlay file system;

compare, by the storage management controller, each package file of the one or more package files stored in the temporary memory location with an associated file or sub-directory in the composite layer;

detect, by the storage management controller, whether a difference exists between the package file and the associated file or sub-directory in the composite layer; and write the package file of the one or more package files to the upper filesystem if a difference is detected between the package file and the associated file or sub-directory in the composite layer.

23. The non-transitory computer-readable medium of claim 22, further comprising instructions to not write the package file of the one or more package files to the upper filesystem if the package file is not different from the associated file or sub-directory in the composite layer.

24. The non-transitory computer-readable medium of claim 23, further comprising instructions to delete the package file of the one or more package files from the temporary memory location.

\* \* \* \* \*